United States Patent
Tsyrganovich

(10) Patent No.: US 8,514,328 B2
(45) Date of Patent: Aug. 20, 2013

(54) MOTION VECTOR BASED IMAGE SEGMENTATION

(75) Inventor: Anatoliy Vasilevich Tsyrganovich, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 240 days.

(21) Appl. No.: 12/979,103

(22) Filed: Dec. 27, 2010

(65) Prior Publication Data

US 2012/0162506 A1     Jun. 28, 2012

(51) Int. Cl.
    *H04N 7/01*         (2006.01)
(52) U.S. Cl.
    USPC .......................................... 348/441; 348/452
(58) Field of Classification Search
    USPC ......... 348/441, 448, 451–452, 449, 699–700, 348/458–459
    IPC ....................................................... H04N 7/01
    See application file for complete search history.

(56) References Cited

U.S. PATENT DOCUMENTS

| | | | | |
|---|---|---|---|---|
| 6,900,846 | B2 * | 5/2005 | Lee et al. | 348/459 |
| 7,116,372 | B2 * | 10/2006 | Kondo et al. | 348/448 |
| 7,663,695 | B2 * | 2/2010 | Pau et al. | 348/452 |
| 8,259,225 | B2 * | 9/2012 | Chappalli et al. | 348/441 |
| 2011/0075027 | A1 * | 3/2011 | Wu et al. | 348/452 |

* cited by examiner

*Primary Examiner* — Trang U Tran
(74) *Attorney, Agent, or Firm* — Seed IP Law Group PLLC

(57) ABSTRACT

One or more digital video frames are interpolated using motion compensated temporal interpolation (MCTI). The quality of motion vectors corresponding to object motion between the two adjacent second video frames is detected. An average of forward motion vectors and an average of backward motion vectors representing motion of the object are compared by calculating the absolute value difference of the averaged forward and backward motion vectors to detect the quality of the motion vectors and a control signal is generated corresponding to the detected quality. Customized Image segmentation based on a first mode of image processing, a second mode of image processing or a combination of the first and second modes of image processing is then performed based on the detected accuracy to generate the interpolated frame.

20 Claims, 10 Drawing Sheets

MOTION VECTOR BASED IMAGE SEGMENTATION

BACKGROUND

1. Technical Field

The present disclosure relates to digital video processing, and more particularly, to temporal interpolation of digital video frames.

2. Description of the Related Art

Digital video compression is used to reduce the quantity of data used to represent digital video images, and may be a combination of spatial image compression and temporal motion compensation. Digital video compression and decompression schemes often result in jerky or inaccurate object motions appearing within the video due to a particular compression scheme used to achieve a large compression ratio, moving objects being blocked in a video frame by other objects, a very low bit rate requirement, and/or due to skipped or missing video frames.

To smooth out object motions, motion compensated temporal interpolation (MCTI) may be used in which a block-based motion search is implemented to establish temporal association between two adjacent reconstructed frames. Both forward and backward searches are used to account for uncovered and newly covered areas. With MCTI, one or more frames can be interpolated or inserted between the two adjacent frames with acceptable visual quality. MCTI creates an image in between the two adjacent frames based on motion vectors by projecting picture elements (pixels) from current and/or previous frames onto a predetermined temporal position. The quality of the reconstructed image depends greatly on the quality of these motion vectors for the object.

BRIEF SUMMARY

One or more digital video frames may be interpolated or inserted between two other temporally adjacent video frames to smooth out and thus improve the appearance of an object moving in a video sequence including the two frames. One embodiment of the invention includes detecting the quality (i.e., level of agreement between) motion vectors corresponding to object motion between the two adjacent video frames. This is performed by comparing an average of forward motion vectors representing motion of the object in one direction to an average of backward motion vectors representing motion of the object in the opposite direction between the two video frames. Customized image segmentation is then performed based on the detected quality to generate the interpolated or inserted frame.

DETAILED DESCRIPTION

Figure 1A:
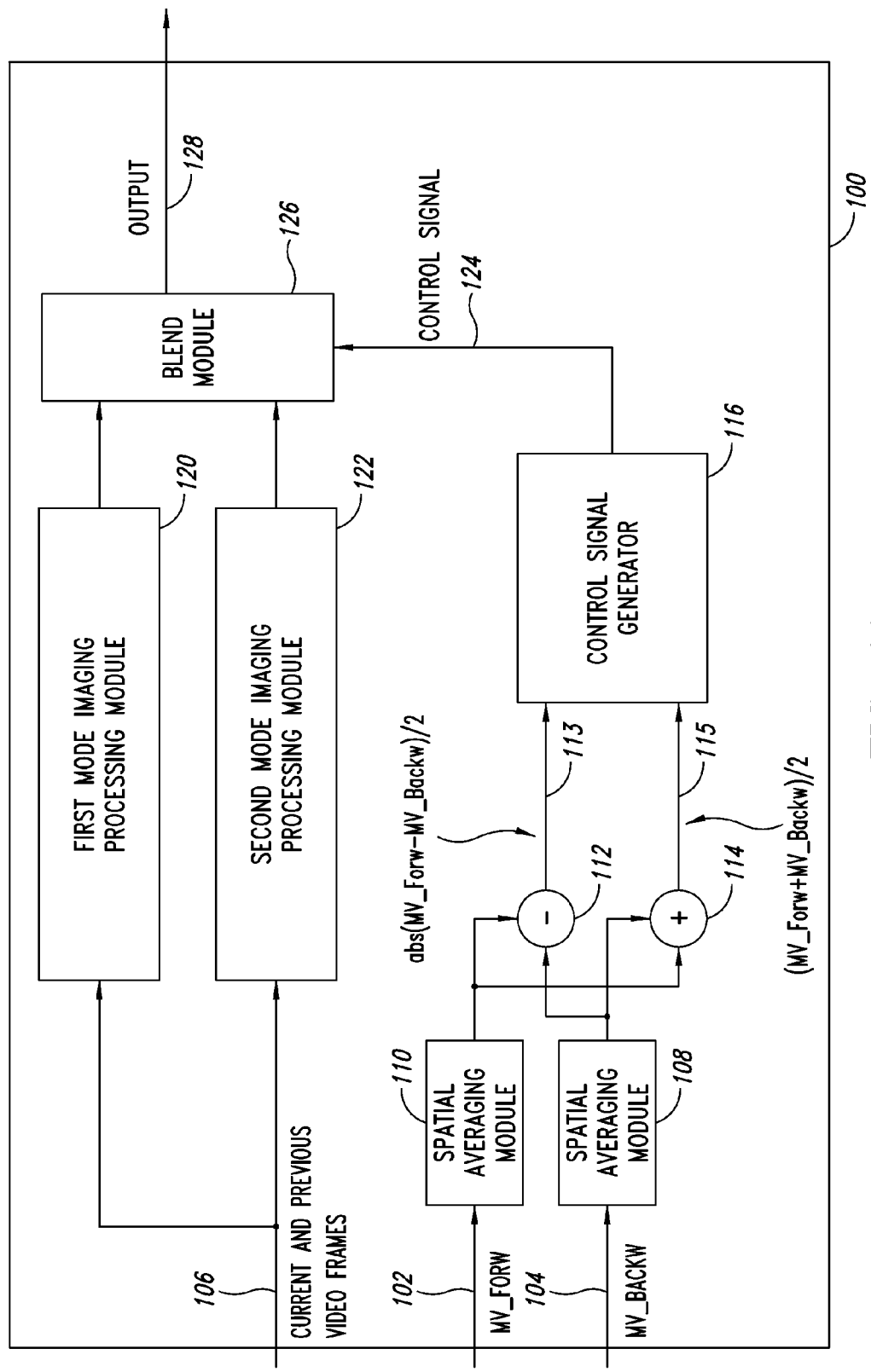
FIG. 1A shows a schematic diagram of an example system for motion vector based image segmentation according to one embodiment.

FIG. 1A shows a schematic diagram of an example system 100 for motion vector based image segmentation according to one embodiment. The system 100 is configured for detecting the quality of motion vectors corresponding to object motion between a first video frame and a temporally adjacent second video frame by comparing a forward motion vector to a backward motion vector of the same object. Having a high quality of forward and backward motion vectors means there is a high level of agreement between the vectors with respect to where an object associated with the motion vectors should be placed within an interpolated digital video frame. Generally, the smaller the absolute value difference between forward and backward motion vectors corresponding to a particular object, the higher the quality of those motion vectors. The system 100 is also configured to generate a control signal corresponding to the detected quality, execute image segmentation corresponding to the control signal, and generate an interpolated video frame between the first and second frame based on the image segmentation.

The following is a description of the parts and structure of the system 100. Following the description of the parts and structure of the system 100 will be a description of the operation of the system 100.

Shown are spatial averaging module 110, spatial averaging module 108, a motion vector subtraction module 112, a motion vector addition module 114, a control signal generator 116, a first mode image processing module 120, a second mode image processing module 122, and a blend module 126.

The first mode processing module 120 and the second mode processing module 122 are both coupled to the video frame input 106. Spatial averaging module 110 is coupled to the forward motion vector input 102 and spatial averaging module 108 is coupled to the backward motion vector input 104. Motion vector subtraction module 112 and a motion vector addition module 114 each have inputs coupled to both an output of the spatial averaging module 110 and an output of the spatial averaging module 108.

The control signal generator 116 has an input coupled to the output 113 of the motion vector subtraction module 112 and an input coupled to the output 115 of the motion vector addition module 114. The control signal generator output 124 is coupled to an input of the blend module 126. Also, the output of the first mode image processing module 120 and the output of the second mode image processing module 122 is coupled to inputs of the blend module 126.

The following is a description of the operation of the system 100.

Data associated with a first digital video frame (e.g., a previous digital video frame) and a temporally adjacent second digital video frame (e.g., a current digital video frame) is received through the video frame input 106. Data associated with forward motion vectors for an object represented in the digital video frames is received through forward motion vector input 102. Data associated with corresponding backward motion vectors for the object is received through backward motion vector input 104. The corresponding forward motion vectors and backward motion vectors are associated with pixels or blocks of pixels representing an object in the first digital video frame and the same object in the temporally adjacent second digital video frame. The same object may have one or more motion vectors associated with it and there may be one or more objects in each frame which have motion vectors provided. The forward motion vectors and backward motion vectors correspond to motion or estimated motion of the object between the first digital video frame and the temporally adjacent second digital video frame in the applicable forward or backward direction in time. The forward motion vector provides data regarding the motion of the object from a first frame to a second, later frame, namely, as the frames proceed forward. The backward motion vector provides data regarding the motion of the object from the second frame to the first frame, namely from the second later frame back to the prior first frame.

Spatial averaging module 110 is configured to compute an average of forward motion vectors for a block of data associated with a particular area representing the object within the video frame. Similarly, spatial averaging module 108 is configured to compute an average of backward motion vectors for a block of data associated with a particular area representing the object within the video frame.

The motion vector addition module 114 is configured to compute the sum of the amplitudes of the averaged forward motion vector and the averaged backward motion vector and divide the result by two to produce an average amplitude. The motion vector addition module 114 then provides an output 115 of the resulting value. The motion vector subtraction module 112 is configured to compute the absolute value difference between the averaged forward motion vector and the averaged backward motion vector. The motion vector subtraction module 112 may then multiply or divide this absolute value difference by a scaling factor, in one example, divide the absolute value difference by two. The motion vector subtraction module 112 then provides an output 113 of the resulting value.

The control signal generator 116 is configured to use the output 113 of the motion vector subtraction module 112 and the output 115 of the motion vector addition module 114. The control signal generator 116 is configured to use the output of the motion vector addition module 114 to determine a lower threshold and an upper threshold based on the average motion vector amplitude output from the motion vector addition module 114. The control signal generator 116 is configured to use the output of the of the motion vector subtraction module 112 to determine whether the absolute value difference output from the motion vector subtraction module 112 falls within the range defined by the lower threshold and the upper threshold and to output a control signal 124 based on that determination. The operation of the control signal generator is further described below with reference to FIGS. 1B and 1C.

The first mode image processing module 120 is configured to process the data associated with the first digital video frame (e.g., a previous digital video frame) and the temporally adjacent second digital video frame (e.g., a current digital video frame) in a manner for which having a high quality of forward and backward motion vectors for an object in the video frames is conducive. For example, the first mode image processing module 120 is configured to perform temporal interpolation (which may include frame reconstruction for the interpolated frame) for the first video frame and second video frame that is specially configured based on the motion vectors for those frames being of a high quality. Conversely, the second mode image processing module 122 is configured to perform frame reconstruction or temporal interpolation for the first video frame and second video frame that is specially configured based on the motion vectors for those frames having a low quality.

The blend module 126 is configured to perform image segmentation to generate an interpolated frame between the first video frame and second video frame using output from either the first mode of image processing 120, the second mode of image processing 122, or by using a combination of the output of the first mode of image processing and the second mode of image processing. Image processing and blending use of different image processing techniques in digital video processing is well known to those of skill in the art. However, described herein are novel systems and methods to determine which image processing technique to use at a particular moment or how much to use a particular image processing technique versus a different image processing technique. For example, in response to the control signal 124 having a value (i.e., an agreement value) indicating a high quality of (i.e., high level of agreement between) the motion vectors, the blend module 126 generates an interpolated frame between the first video frame and second video frame using solely the output of the first mode image processing module 120. In response to the control signal 124 having a value indicating low quality of the motion vectors, the blend module generates an interpolated frame between the first video frame and second video frame using solely the output of the second mode image processing module 122. If the value of control signal 124 is between the low and high values, then the blend module 126 generates an interpolated frame between the first video frame and second video frame using a combination of the output from first mode image processing module 120 and the second mode image processing module 122. In this case, the combination is in proportion to the value of the control signal 124. For example, the higher the value of the control signal 124, the more the output from the second mode image processing module 122 will be used to perform the interpolation and the less the output from the first mode image processing module 120 will be used.

Data representing the resulting reconstructed or interpolated frame is provided on the blend module output 128. Performing the image segmentation to generate the interpolated or reconstructed frame in the manner described above corresponding to the quality of the motion vectors will increase the quality of the interpolated image while reducing impact on overall system performance for this higher quality image.

Figure 1B:
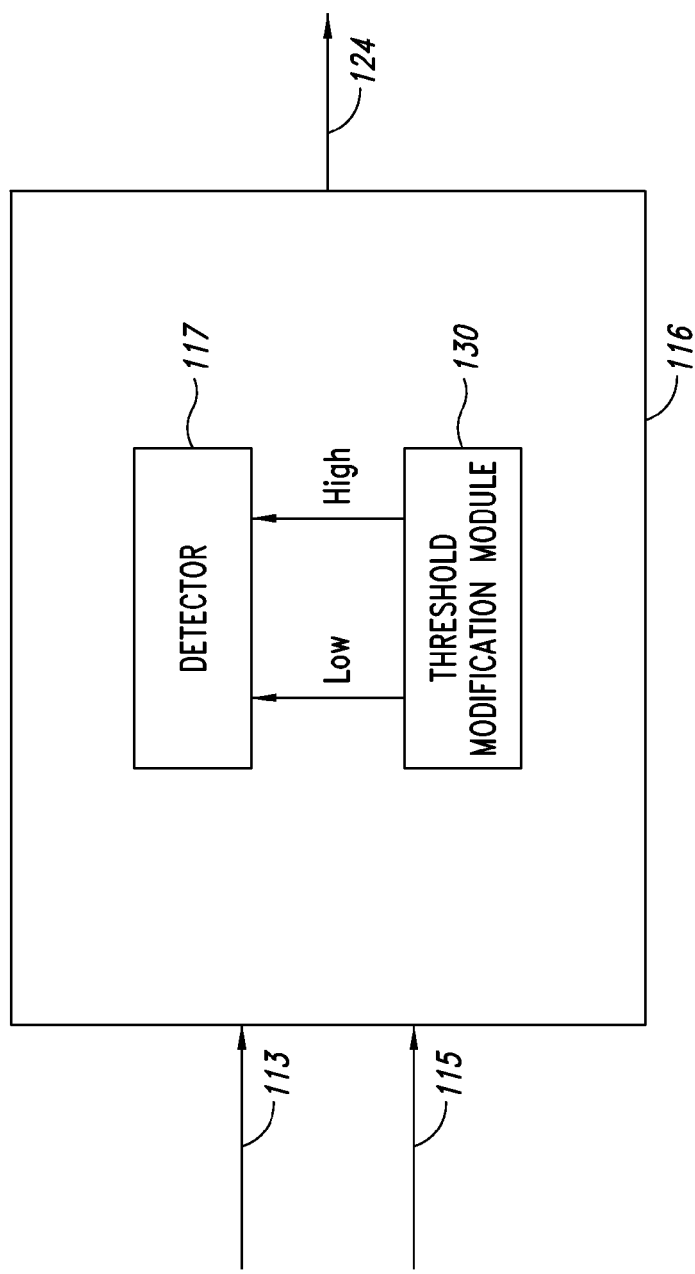
FIG. 1B shows a schematic diagram of the control signal generator in the example system for motion vector based image segmentation shown in FIG. 1A.

FIG. 1B shows a schematic diagram of the control signal generator 116 in the example system for motion vector based image segmentation shown in FIG. 1A.

The following is a description of the parts and structure of the control signal generator 116. Following the description of the parts and structure of the control signal generator 116 will be a description of the operation of the control signal generator 116.

The control signal generator 116 includes as inputs the output 113 of the motion vector subtraction module 112 and the output 115 of the motion vector addition module 114. The control signal generator 116 includes a threshold modification module 130 and a detector 117. Output of the threshold modification module 130 is coupled to input of the detector 117.

Following is a description of the operation of the control signal generator 116.

The threshold modification module 130 provides upper and lower threshold values to the detector 117. The threshold modification module 130 is configured to use the output 115 of the motion vector addition module 114 to determine a lower threshold and an upper threshold based on the average motion vector amplitude output from the motion vector addition module 114. For example, the threshold modification module 130 of the control signal generator 116 is configured to change the lower and upper threshold to increase or decrease the range defined by the upper threshold and lower threshold corresponding to, and in response to, an increase or decrease in the averaged motion vector amplitude output from the motion vector addition module 114.

The detector 117 is configured to use the output 113 of the motion vector subtraction module 112 to determine whether the absolute value difference output 113 from the motion vector subtraction module 112 falls within a range defined by the upper (or high) threshold and the lower (or low) threshold which have been output by the threshold module 130 and to output a control signal 124 based on that determination.

Figure 1C:
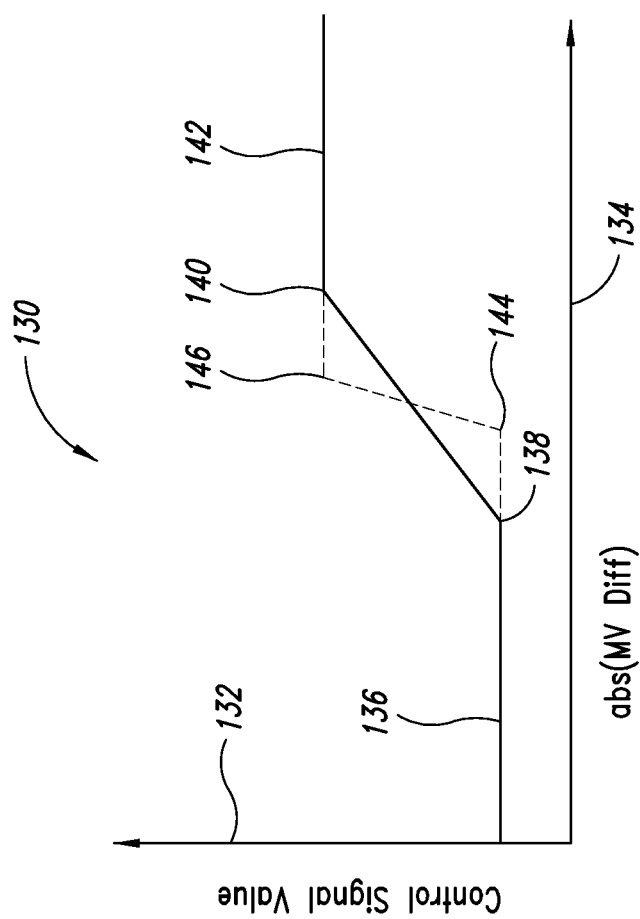
FIG. 1C is a graph of an example control signal value generated by the control signal generator of FIG. 1B.

FIG. 1C is a graph 130 of an example of a possible range of control signal values of control signal 124 generated by the control signal generator 116 of FIGS. 1A and 1B. The y axis 132 represents the control signal value. The x axis 134 represents the absolute value difference between the averaged forward motion vector and the averaged backward motion vector (abs(MV Diff)). In the data region 136 the control signal value has a constant level value indicating a high quality of the motion vectors due to the absolute value difference between the averaged forward motion vector and the averaged backward motion vector being below a lower threshold value. In response to the control signal having this low value, indicating high quality of the motion vectors, the blend module 126 shown in FIG. 1A generates an interpolated frame between the first video frame and second video frame using the output of the first mode image processing module 120 shown in FIG. 1A.

However, at point 138, the control signal value starts to increase indicating an increasingly lower quality of the motion vectors due to the absolute value difference between the averaged forward motion vector and the averaged backward motion vector surpassing the lower threshold value. After point 138, the blend module 126 generates an interpolated frame between the first video frame and second video frame using a combination of the output from first mode image processing module 120 and the second mode image processing module 122 shown in FIG. 1A. In this case, the combination is in proportion to the value of the control signal shown along the y axis 132. The higher the value of the control signal, the more the output from the second mode image processing module 122 will be used to perform the interpolation and the less the output from the first mode image processing module 120 will be used.

At point 140, the control signal value levels off at a constant value indicating a low quality of the motion vectors due to the absolute value difference between the averaged forward motion vector and the averaged backward motion vector surpassing an upper threshold value at point 140. After point 140, (e.g., at data region 142) the control signal value has a constant level value indicating a low quality of the motion vectors due to the absolute value difference between the averaged forward motion vector and the averaged backward motion vector being above the upper threshold value. In response to the control signal having this high value, indicating low quality of the motion vectors, the blend module 126 generates an interpolated frame between the first video frame and second video frame using the output of the second mode image processing module 122 shown in FIG. 1A.

As explained above, the threshold modification module 130 of FIG. 1B, provides the upper and lower threshold values. The threshold modification module 130 of the control signal generator 116 is configured to change the lower and upper threshold to increase or decrease the range defined by the upper threshold and lower threshold corresponding to, and in response to, an increase or decrease in the averaged motion vector amplitude output from the motion vector addition module 114. The dashed line in the graph indicates an example of how the transition points and the slope of the line can change as the threshold values change. The points 144 and 146 along the dashed line in the graph 100 indicate different points at which the control signal value may change based on modified lower and upper threshold values as provided by the threshold modification module 130. Note that in the dashed line example on the graph 100, the modified lower and upper threshold values resulted in a decrease in the range defined by the upper threshold and lower threshold. For example, in response to an increase in the averaged motion vector amplitude output from the motion vector addition module 114, the lower threshold value may increase and the upper threshold may decrease, thus decreasing the range defined by the upper threshold and lower threshold and increasing the slope of the graph of the control signal value as shown by the dashed line in FIG. 1C. While both thresholds are shown as changing in this example, in some cases, only one threshold may change at a time. In addition, the range may stay the same but the location of the two thresholds may change.

The various components and modules of the example system 100 of FIG. 1A for motion vector based image segmentation may be combined or reconfigured to perform the same or additional functionality. For example, the motion vector subtraction module 112, a motion vector addition module 114 and threshold modification module 130 may comprise a single unit or module coupled to the control signal generator 116 or all be part of the control signal generator 116. Other modifications and combinations of applicable modules, components, circuits and processors described herein may also be utilized to perform motion vector based image segmentation.

Figure 2:
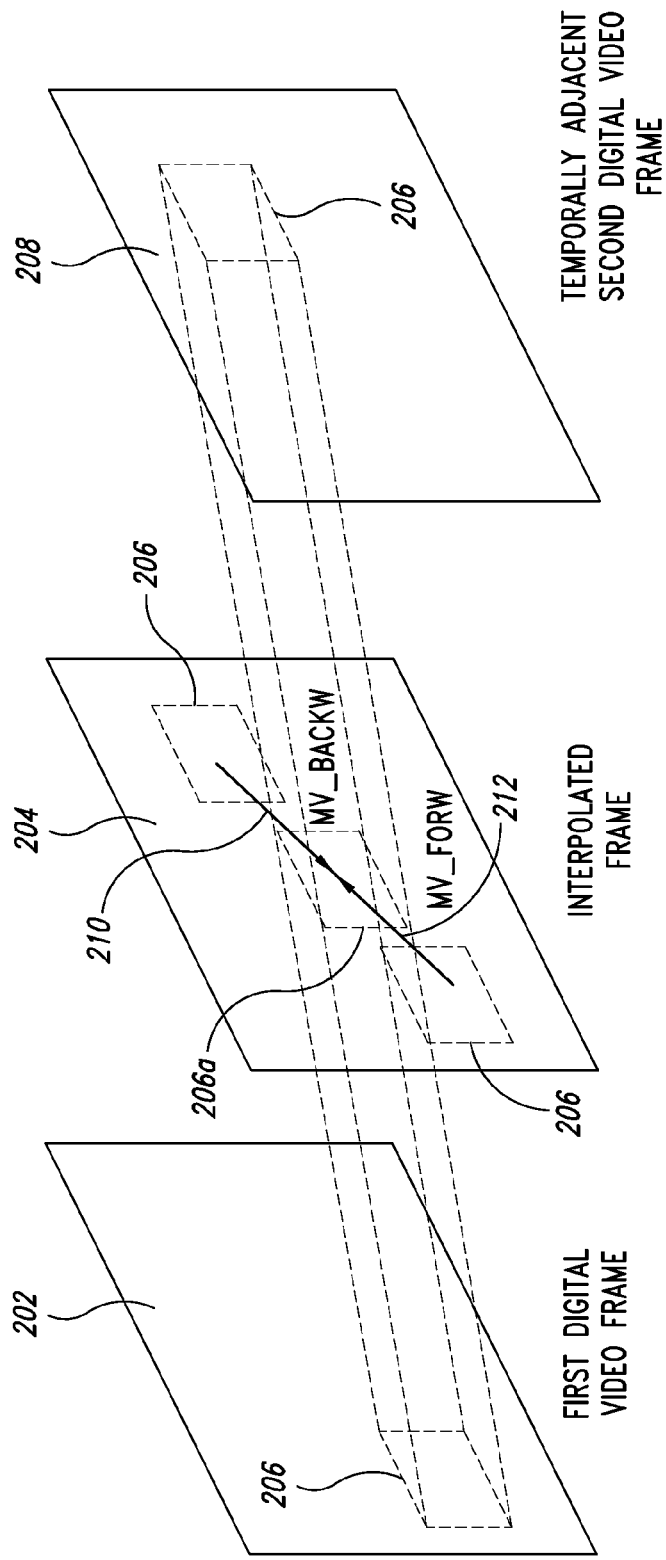
FIG. 2 is a diagram showing an example of video frame interpolation with high quality motion vectors.

FIG. 2 is a diagram showing an example of video frame interpolation 200 with high quality motion vectors. Shown is an example first digital video frame 202, an example temporally adjacent second digital video frame 208 and a newly generated interpolated frame 204 placed between them as explained herein. For example, the first digital video frame 202 and the temporally adjacent second digital video frame 208 could correspond to a previously received digital video frame and a current digital video frame, respectively. However, the first digital video frame 202 and temporally adjacent second digital video frame 208 need not be originally adjacent as there may have been one or more frames between the first digital video frame 202 and temporally adjacent second digital video frame 208 that originally existed. These original frames are not present in the image now being processed and may be gone due to connection errors, bandwidth limitations, encoding or decoding issues, or data compression.

Alternatively, the first and second digital video frames might be original frames that are adjacent to each other in the original image. If may be desired to increase the quality of the image by adding extra frames that show incremental motion of a particular object between adjacent frames. It may also be desired to create additional frames to give more depth, higher quality, HD-type video or other improvements to an existing series of video frames. A new video frame 204 is generated and placed between them to provide three video frames having slightly different images in each where previously there were just two video frames.

Object 206 is within the first digital video frame 202 and temporally adjacent second digital video frame 208. The object 206 or a portion of the object is represented by pixel data corresponding to blocks of pixels that comprise the first digital video frame 202 and temporally adjacent second digital video frame 208. As shown in FIG. 2, the position of the object 206 in the first digital video frame 202 has moved relative to the position of the same object 206 within the temporally adjacent second digital video frame 208 (from the lower left corner to the upper right corner of the frame).

An interpolated frame 204 is shown inserted between the first digital video frame 202 and temporally adjacent second digital video frame 208 including the object 206 at an estimated position shown at position 206a. The position of object 206 is estimated during frame interpolation based on the backward motion vector 210 and/or the forward motion vector 212. In FIG. 2, the backward motion vector 210 and the forward motion vector 212 are considered highly accurate, namely of high quality, because they estimate the motion of the object 206 in a manner that places the object in substantially the same position within the interpolated frame 204. This is indicated by the difference (i.e., the absolute value difference), if any, between the forward motion vector 212 and the backward motion vector 210 being relatively small.

In case that the motion vector based image segmentation shown in FIG. 1A has generated, the control signal value would indicate a high quality of the forward motion vector 212 and the backward motion vector 210. Thus, the blend module 126 of FIG. 1A would generate the interpolated frame 204 between the first video frame 202 and the second video frame 208 using output from the first mode image processing module 120.

Figure 3A:
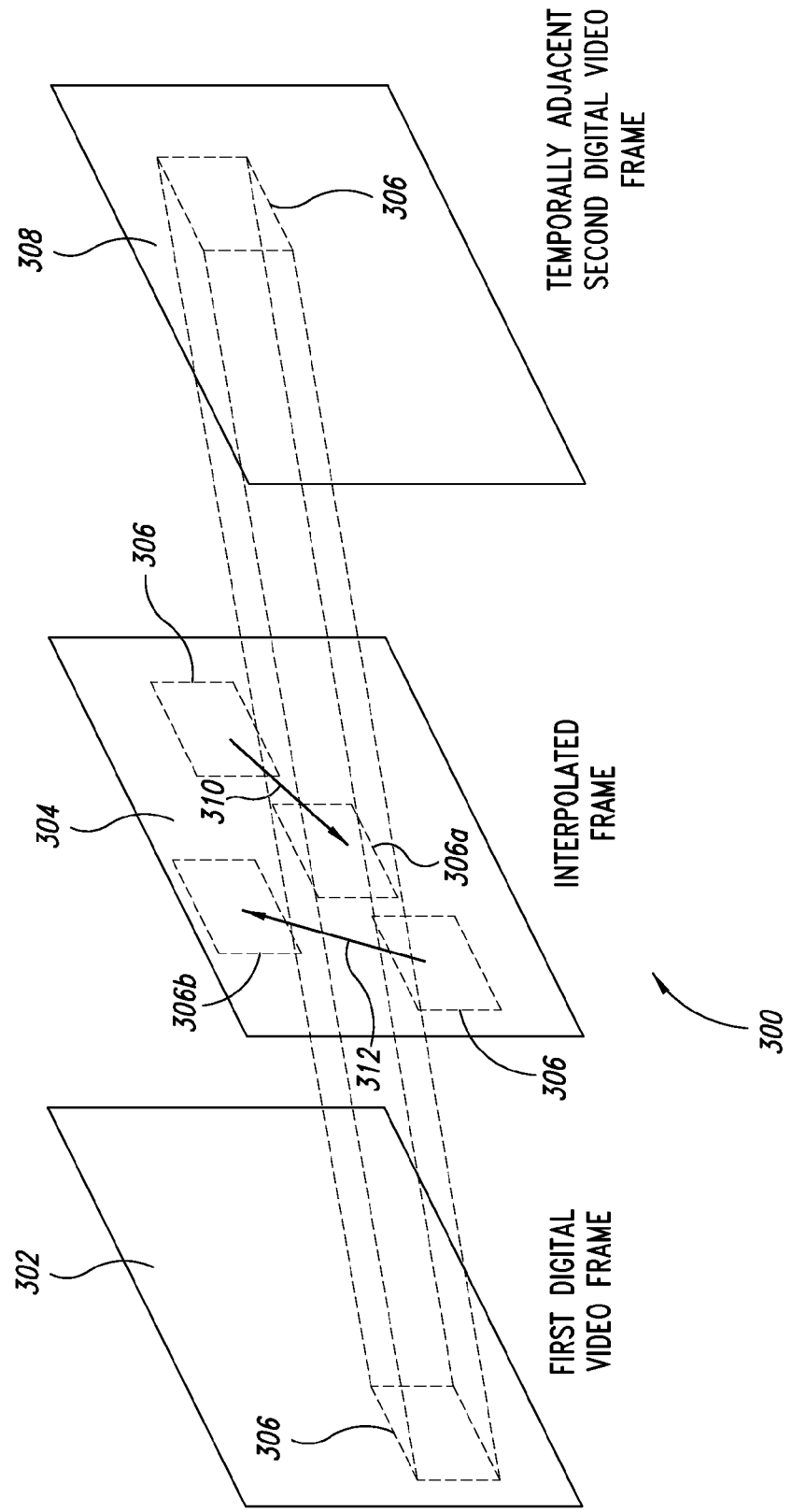
FIG. 3A is a diagram showing an example of video frame interpolation with low quality motion vectors.

FIG. 3A is a diagram showing another example of video frame interpolation 300, but with low quality motion vectors. Another example of first digital video frame 302 and a temporally adjacent second digital video frame 308 have an object 306 within the first digital video frame 302 and temporally adjacent second digital video frame 308. As shown in FIG. 3A, the position of the object 306 in the first digital video frame 302 has also moved relative to the position of the same object 306 within the temporally adjacent second digital video frame 308 (again from the lower left corner to the upper right corner of the frame).

An interpolated frame 304 is shown inserted between the first digital video frame 302 and temporally adjacent second digital video frame 308 including the object 306 at various estimated positions. In FIG. 3A, the backward motion vector 310 and the forward motion vector 312 are considered of low quality because they estimate the motion of the object 306 in a manner that would place the object 306 in largely different positions (shown as 306a and 306b, respectively) within the interpolated frame 304. This is indicated by the difference (i.e., absolute value difference) between the forward motion vector 312 and the backward motion vector 310 being relatively large. In the interpolation shown in FIG. 3A, the position of the object 306 is shown estimated based on each of the backward motion vector 310 and the forward motion vector 312. However, the location of the object may be based on both the backward motion vector 310 and forward motion vector 312, even if they differ, or are of low quality, using the system for motion vector based image segmentation shown in FIG. 1A and according to the methods described herein to compensate instances of high quality, low quality motion vectors, or an intermediate quality.

Figure 3B:
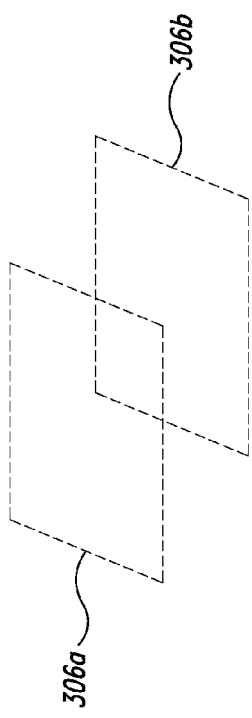
FIG. 3B is a diagram showing two example placements of an object in an interpolated video frame based on different forward and backward motion vectors for the object.
Figure 3C:
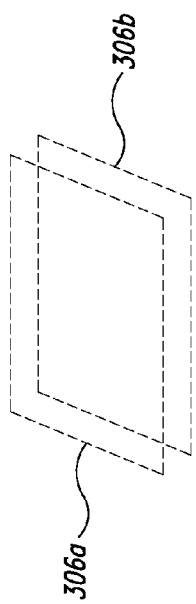
FIG. 3C is a diagram showing another two example placements of an object in an interpolated video frame based on different forward and backward motion vectors for the object.

FIGS. 3B and 3C are diagrams showing two examples of possible placements of the object 306 in an interpolated video frame based on different forward and backward motion vectors for the object. In FIG. 3B the indicated positions 306a and 306b for object 306 are further apart from each other than the indicated positions 306a and 306b for object 306 in FIG. 3C. This corresponds to a larger difference (i.e., absolute value difference) between the forward motion vector and the backward motion vector for object 306 in the example of FIG. 3B than the example of FIG. 3C.

In FIG. 3C the indicated positions 306a and 306b for object 306 are much closer to each other than the indicated positions 306a and 306b for object 306 in FIG. 3B. This corresponds to a smaller difference (i.e., absolute value difference) between the forward motion vector and the backward motion vector for object 306 in the example of FIG. 3C than the example of FIG. 3B. Accordingly, the value of control signal 124 generated by the control signal generator 116 may, for example, indicate a higher quality of motion vectors for object 306 than it would for the motion vectors resulting in the example shown in FIG. 3B. Thus, as compared to the scenario described above regarding FIG. 3B, the value of the control signal 124 would cause the blend module 126 to use the output of the first mode image processing module 120 to a greater extent than the second mode image processing module 122, or perhaps, use only output of the first mode of image processing module 120 if the difference (i.e., absolute value difference) between the forward motion vector and the backward motion vector for object 306 falls below the threshold value.

In applying the example shown in FIG. 3A to the motion vector based image segmentation shown in FIG. 1A, the control signal value would indicate a low quality of the forward motion vector 312 and the backward motion vector 310. Thus, the blend module 126 would generate the interpolated frame 304 between the first video frame 302 and the second video frame 308 using output from the second mode image processing module 122 instead of the output from the first mode image processing module 120. In FIG. 3B, the two motion vectors are of medium quality and are substantially closer to each other than the example of FIG. 3A. The control signal will have a lower value than the one present in FIG. 3A. The blend module 126 will therefore use some input for first mode imaging module 120, but a large portion of its input from the second mode imaging module 127.

In FIG. 3C the two motion vectors are much closer together and are nearly the same. The resultant locations of 306a and 306b are thus closer to each other. Accordingly, control signal 82 will have an even lower value and the blend module 126 will use a larger proportion of the output from the first mode imaging module 120 and a smaller portion of the input from the second mode imaging module 122.

The control signal will have a value above the data point 138, so there will be a blending of the outputs from modules 120 and 122, but the ratio of the signal from the first module 120 will be greater than from the second module 122 than for the example of FIG. 3B.

Figure 4:
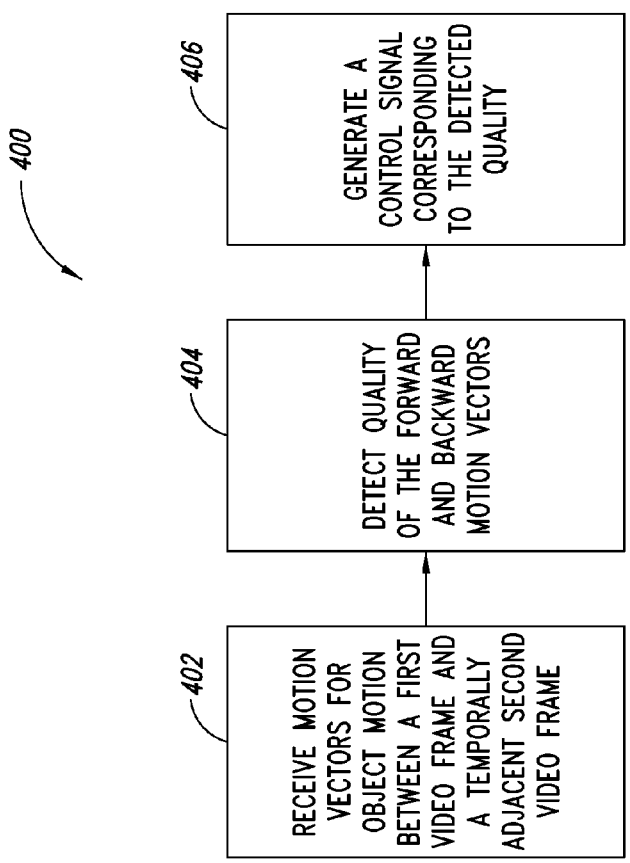
FIG. 4 is a flow chart showing an example process of motion vector analysis according to one embodiment.

FIG. 4 is a flow chart showing an example process 400 of motion vector analysis according to one embodiment. In particular, FIG. 4 illustrates process 400 that is performed or implemented by, for example, one or more modules or components of the system for motion vector based image segmentation shown in FIG. 1A or any combination of suitable hardware, firmware or software components or devices including those that are a part of or configure the computing environment of FIG. 7.

At 402, the process receives motion vectors for object motion between a first video frame and a temporally adjacent second video frame. The object is represented by one or more blocks of pixels that comprise the first video frame and the temporally adjacent second video frame. The motion vectors are forward and backward motion vectors including pixel data representing motion of the object represented by the one or more blocks of pixels.

At 404, the process detects the quality of the forward and backward motion vectors.

At 406, the process generates a control signal corresponding to the detected quality. The process 400 may also repeat the actions described above such for any number of video frames part of any given video sequence. Also the process may include additional actions to perform other appropriate image or signal processing.

Figure 5:
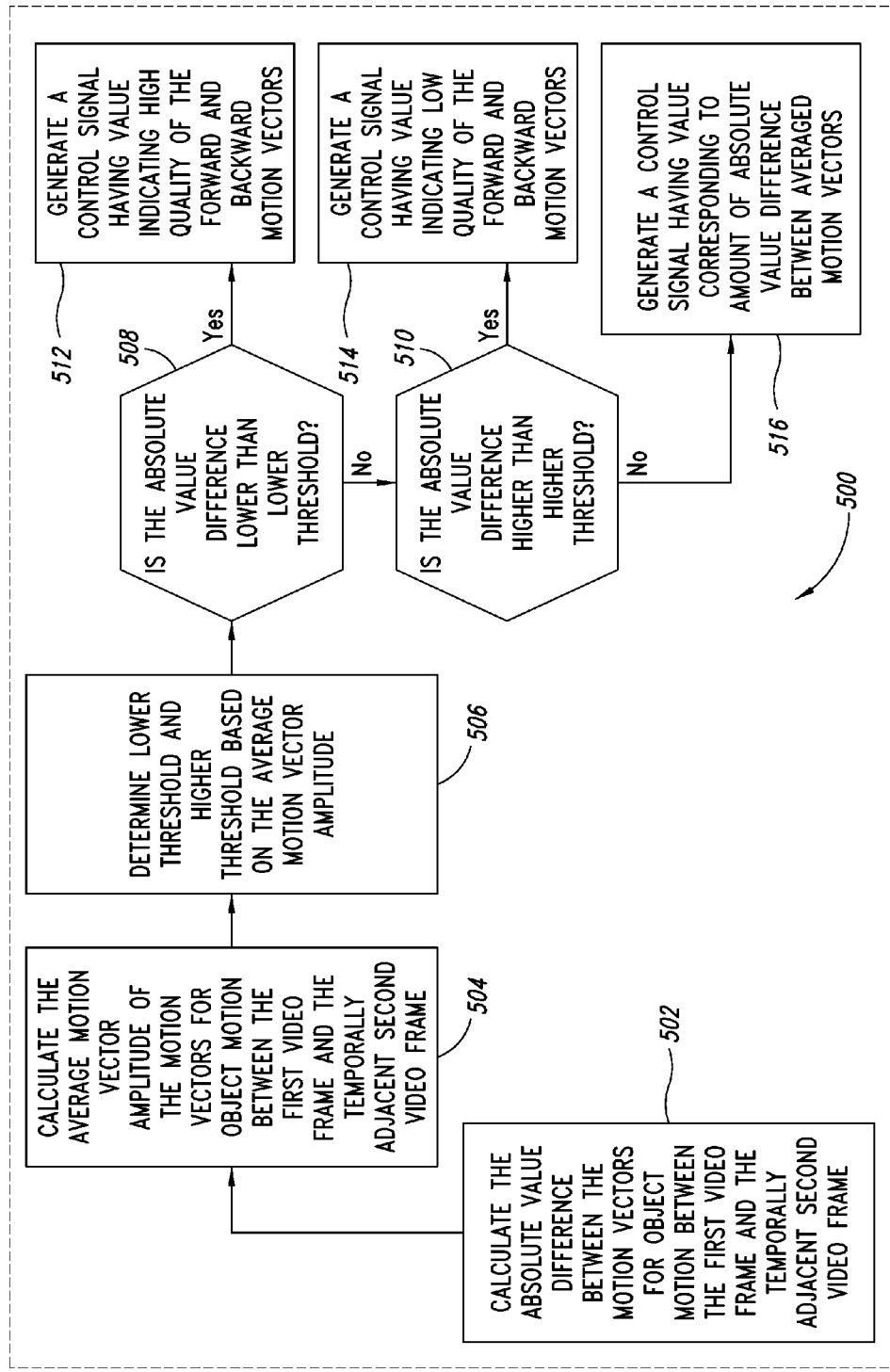
FIG. 5 is a flow chart showing a more detailed view of the portion of the process of FIG. 4 for detecting motion vector quality according to one embodiment.

FIG. 5 is a flow chart showing a more detailed example view of the portion 404 of the process 400 of FIG. 4 for detecting motion vector quality according to one embodiment. In particular, FIG. 5 illustrates process 500 that is performed or implemented by, for example, one or more modules or components of the system for motion vector based image segmentation shown in FIG. 1A or any combination of suitable hardware, firmware or software components or devices including those that are a part of or configure the computing environment of FIG. 7.

At 502, the process calculates the absolute value difference between averaged motion vectors for motion of the object between the first video frame and the temporally adjacent second video frame. In particular, the absolute value difference is the absolute value difference of forward and backward motion vectors for the object.

At 504, the process calculates the average motion vector amplitude of the averaged motion vectors for object motion between the first video frame and the temporally adjacent second video frame. In particular, the average motion vector amplitude is the average motion vector amplitude of averaged forward and averaged reverse motion vectors for the object. At 506, the value of the lower threshold and upper threshold are adjusted based on the average motion vector amplitude.

At 508, the process determines whether the calculated absolute value difference is lower than the lower threshold. If the calculated absolute value difference is lower than the lower threshold, then the process continues to 512.

At 512, the process generates a control signal having a value indicating a high quality of the forward and backward motion vectors. However, if the calculated absolute value difference is not lower than the lower threshold, then the process continues to 510 from the previous decision point at 508.

At 510, the process determines whether the absolute value difference is higher than the higher threshold. If the absolute value difference is higher than the higher threshold, then the process continues to 514.

At 514, the process generates a control signal having a value indicating a low quality of the forward and backward motion vectors. However, if the absolute value difference is not higher than the higher threshold, then the process continues to 516 from the previous decision point at 510.

At 516, the process generates a control signal having a value corresponding to an amount of the absolute value difference between the averaged motion vectors. In particular, the process generates a control signal having a value corresponding to or proportional to the amount of the absolute value difference between the averaged forward motion vectors and averaged reverse motion vectors for the object.

Figure 6:
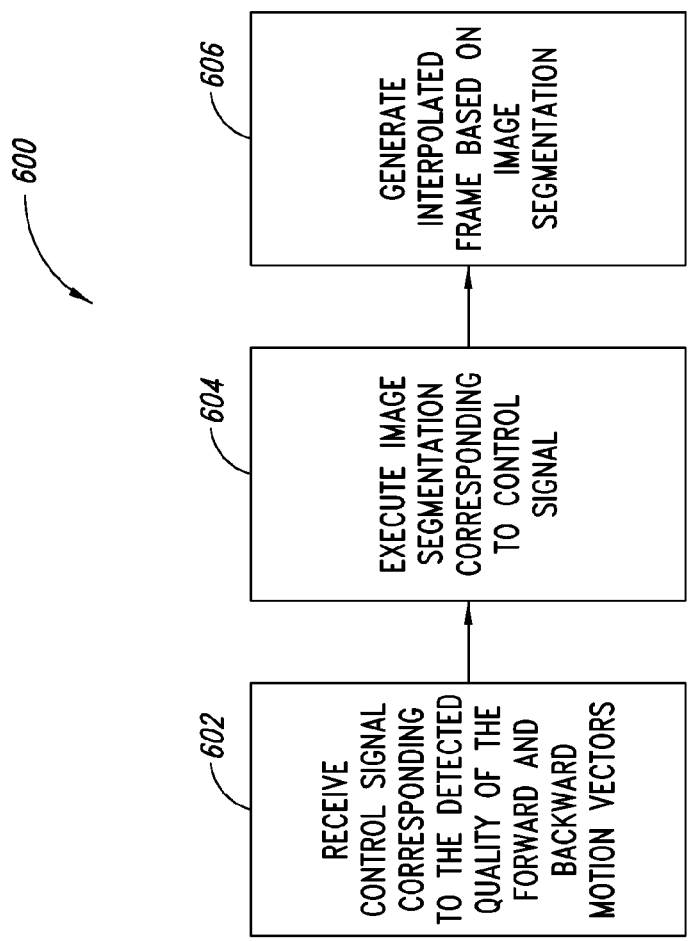
FIG. 6 is a flow chart showing an example process of generating an interpolated frame using the control signal generated by the process of FIG. 4.

FIG. 6 is a flow chart showing an example process 600 of generating an interpolated frame using the control signal generated by the process 400 of FIG. 4. In particular, FIG. 6 illustrates process 600 that is performed or implemented by, for example, one or more modules or components of the system for motion vector based image segmentation shown in FIG. 1A or any combination of suitable hardware, firmware or software components or devices including those that are a part of, or configure, the computing environment of FIG. 7.

At 602, the process receives a control signal corresponding to the detected quality of the forward and backward motion vectors of the received motion vectors for the object.

At 604, the process executes image segmentation corresponding to the received control signal. For example, the value of the control signal is used to determine whether to use a particular mode of image processing (e.g., a first mode of image processing or a second mode of image processing), or may indicate in what proportions a first mode of image processing and a second mode of image processing should be used in performing the image.

At 606, the process generates the interpolated frame based on the applicable image segmentation. For example, the process generates an interpolated frame between the first received digital video frame and the second temporally adjacent digital video frame.

Figure 7:
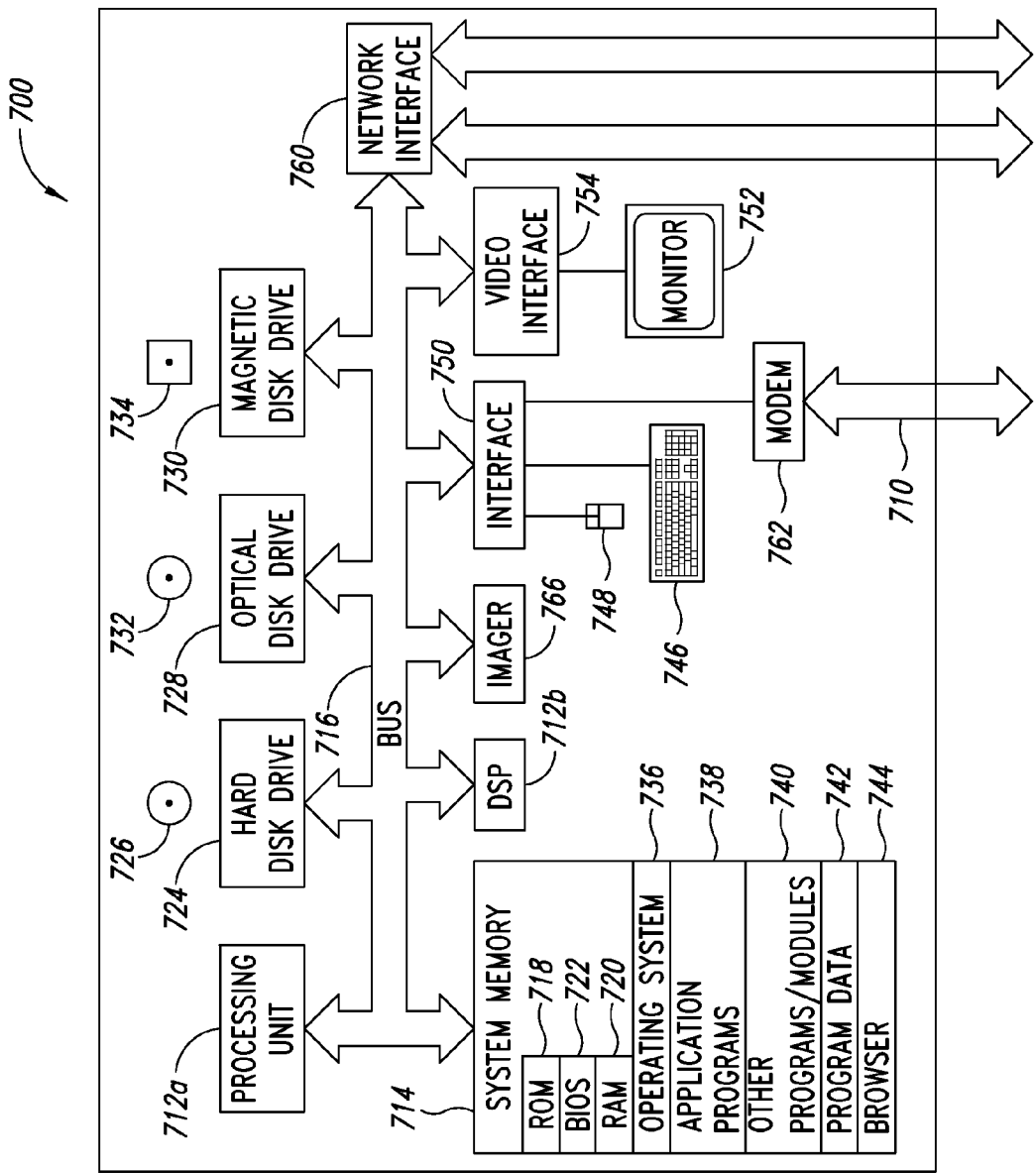
FIG. 7 is a schematic diagram of a computing environment in which motion vector based image segmentation may be implemented or of which it may be a part.

FIG. 7 is a schematic diagram of computing environment in which motion vector based image segmentation may be implemented or of which it may be a part. For example, processes 400, 500 and 600 described above in conjunction with FIGS. 4, 5, and 6 are performed or implemented by one or more modules or components of the system for motion vector based image segmentation shown in FIG. 1A which may be implemented by any combination of suitable hardware, firmware or software components or devices including those that are a part of, or configure, the computing environment of FIG. 7.

The computing environment 700 will at times be referred to in the singular herein, but this is not intended to limit the embodiments to a single device since in typical embodiments there may be more than one computer system or device involved. Unless described otherwise, the construction and operation of the various blocks shown in FIG. 7 are of conventional design. As a result, such blocks need not be described in further detail herein, as they will be understood by those skilled in the relevant art.

The computing environment 700 may include one or more processing units 712a, 712b (collectively 712), a system memory 714 and a system bus 716 that couples various system components including the system memory 714 to the processing units 712. The processing units 712 may be any logic processing unit, such as one or more central processing units (CPUs) 712a, digital signal processors (DSPs) 712b, digital video or audio processing units such as coder-decoders (codecs) or compression-decompression units, application-specific integrated circuits (ASICs), field programmable gate arrays (FPGAs), etc. The system bus 716 can employ any known bus structures or architectures, including a memory bus with memory controller, a peripheral bus, and a local bus. The system memory 714 includes read-only memory ("ROM") 718 and random access memory ("RAM") 720. A basic input/output system ("BIOS") 722, which can form part of the ROM 718, contains basic routines that help transfer information between elements within the computing environment 700, such as during start-up.

The computing environment 700 may include a hard disk drive 724 for reading from and writing to a hard disk 726, an optical disk drive 728 for reading from and writing to removable optical disks 732, and/or a magnetic disk drive 730 for reading from and writing to magnetic disks 734. The optical disk 732 can be a CD-ROM, while the magnetic disk 734 can be a magnetic floppy disk or diskette. The hard disk drive 724, optical disk drive 728 and magnetic disk drive 730 may communicate with the processing unit 712 via the system bus 716. The hard disk drive 724, optical disk drive 728 and magnetic disk drive 730 may include interfaces or controllers (not shown) coupled between such drives and the system bus 716, as is known by those skilled in the relevant art. The drives 724, 728 and 730, and their associated computer-readable storage media 726, 732, 734, may provide nonvolatile and non-transitory storage of computer readable instructions, data structures, program modules and other data for the computing environment 700. Although the depicted computing environment 700 is illustrated employing a hard disk 724, optical disk 728 and magnetic disk 730, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 712a.

Program modules can be stored in the system memory 714, such as an operating system 736, one or more application programs 738, other programs or modules 740 and program data 742. Application programs 738 may include instructions that cause the processor(s) 712 to perform motion vector based image segmentation and receive, store and play digital video generated by motion vector based image segmentation or on which motion vector based image segmentation will be performed. Other program modules 740 may include instructions for handling security such as password or other access protection and communications encryption. The system memory 714 may also include communications programs, for example, a Web client or browser 744 for permitting the computing environment 700 to access and exchange data including digital video with sources such as Web sites of the Internet, corporate intranets, extranets, or other networks and devices as described herein, as well as other server applications on server computing systems. The browser 744 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 7 as being stored in the system memory 714, the operating system 736, application programs 738, other programs/modules 740, program data 742 and browser 744 can be stored on the hard disk 726 of the hard disk drive 724, the optical disk 732 of the optical disk drive 728 and/or the magnetic disk 734 of the magnetic disk drive 730.

An operator can enter commands and information into the computing environment 700 through input devices such as a touch screen or keyboard 746 and/or a pointing device such as a mouse 748, and/or via a graphical user interface in order to receive, process, store and send digital video on which motion vector based image segmentation has been or will be performed as described herein. Other input devices can include a microphone, joystick, game pad, tablet, scanner, etc. These and other input devices are connected to one or more of the processing units 712 through an interface 750 such as a serial port interface that couples to the system bus 716, although other interfaces such as a parallel port, a game port or a wireless interface or a universal serial bus ("USB") can be used. A monitor 752 or other display device is coupled to the system bus 716 via a video interface 754, such as a video adapter which may be configured to perform motion vector based image segmentation of the video. The computing environment 700 can include other output devices, such as speakers, printers, etc.

The computing environment 700 can operate in a networked environment using logical connections to one or more remote computers and/or devices. For example, the computing environment 700 can operate in a networked environment using logical connections to one or more other computing systems, mobile devices and other service providers or information servers that provide the digital video in streaming format or other electronic delivery methods. Communications may be via a wired and/or wireless network architecture, for instance wired and wireless enterprise-wide computer networks, intranets, extranets, telecommunications networks, cellular networks, paging networks, and other mobile networks.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of and image segmentation and interpolation of digital video frames. It will be understood by those skilled in the art that, although the embodiments described above and shown in the figures are generally directed to the context of interpolation of digital video frames between two temporally adjacent video frames, applications related to reconstructing current, previous or other video frames for which a set of applicable motion vectors is available, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
receiving digital video data including motion vectors associated with the digital video data;
comparing at least a forward motion vector of the motion vectors to at least a corresponding backward motion vector of the motion vectors;

detecting, based on the comparison, a level of agreement between the forward motion vector and the corresponding backward motion vector corresponding to object motion between a first video frame and a temporally adjacent second video frame; and generating an agreement value corresponding to the detected level of agreement.

2. The method of claim 1 further comprising:

executing image segmentation according to the agreement value; and generating an interpolated video frame between the first and second frame based on the image segmentation.

3. The method of claim 2 wherein the executing image segmentation corresponding to the agreement value comprises:

determining a mode of image processing to use from at least a first mode of image processing, a second mode of image processing, and a combination of the first mode of image processing and the second mode of image processing, the determining based on and in response to a value of the agreement value; and using the determined mode of image processing to execute the image segmentation.

4. The method of claim 1 wherein the detecting the level of agreement comprises:

calculating an absolute value difference between the forward motion vector and backward motion vector; and determining whether the absolute value difference falls within a range defined by an upper threshold and a lower threshold.

5. The method of claim 4 further comprising:

generating an agreement value having a value indicating high level of agreement between the forward motion vector and the backward motion vector in response to the absolute value difference being equal to or falling below the lower threshold; and generating an agreement value having a value indicating level of agreement between the forward motion vector and backward motion vector in response to the absolute value difference being equal to or falling above the upper threshold.

6. The method of claim 5 further comprising:

generating an agreement value having a value corresponding to an amount of the absolute value difference in response to the absolute value difference being between the lower threshold and the upper threshold.

7. The method of claim 4 further comprising:

calculating an average motion vector amplitude of the forward motion vector and backward motion vector; and determining the lower threshold and the upper threshold based on the average motion vector amplitude.

8. The method of claim 7 wherein the determining the lower threshold and the upper threshold based on the average motion vector amplitude comprises increasing the range defined by the upper threshold and lower threshold corresponding to and in response to an increase in the average motion vector amplitude.

9. The method of claim 1 wherein the forward motion vector is a motion vector representing an average of forward motion vectors of the motion vectors and the backward motion vector is a motion vector representing an average of backward motion vectors of the motion vectors.

10. The method of claim 1 wherein the digital video data is received over a wireless connection.

11. The method of claim 1 wherein the digital video data is received by a mobile device.

12. The method of claim 1 wherein the agreement value is represented by an analog control signal.

13. The method of claim 1 wherein the digital video data is in a compressed format.

14. The method of claim 1 wherein the digital video data is in an uncompressed format.

15. A device for processing digital video comprising:

a memory configured to store digital video data including data defining motion vectors associated with the digital video data;

at least one spatial averaging module coupled to the memory configured to spatially average the motion vectors;

a first mode processing module coupled to the memory;

a second mode processing module coupled to the memory; and an image processor coupled to the a first mode processing module and second mode processing module configured to execute image segmentation to generate an interpolated frame between a first video frame and a second video frame included in the digital video data using a first mode of image processing in response to an agreement value having a value indicating high level of agreement between forward and backward motion vectors associated with an object in the first video frame and a second video frame.

16. The device of claim 15 wherein the image processor is further configured to perform image segmentation to generate an interpolated frame between the first video frame and second video frame using a second mode of image processing in response to the agreement value having the value indicating low level of agreement between the motion vectors associated with the object.

17. The device of claim 16 wherein the image processor is further configured to perform image segmentation to generate an interpolated frame between the first video frame and second video frame using a combination of the first mode of image processing and the second mode of image processing in response to the agreement value not having the value indicating low level of agreement between the motion vectors associated with the object while also not having the value indicating high level of agreement between the motion vectors associated with the object, the combination in proportion to the agreement value.

18. A non-transitory computer readable storage medium, having computer executable instructions thereon, that when executed by a computer processor cause the following method to be performed:

receiving digital video data including motion vectors associated with the digital video data;

comparing at least a forward motion vector of the motion vectors to at least a corresponding backward motion vector of the motion vectors;

detecting, based on the comparison, a level of agreement between the forward motion vector and backward motion vector corresponding to object motion between a first video frame and a temporally adjacent second video frame; and generating an agreement value corresponding to the detected level of agreement.

19. The non-transitory computer readable storage medium of claim 18 wherein the computer executable instructions thereon, when executed by a computer processor, further cause generating an interpolated video frame between the first and second frame based on image segmentation to be performed.

20. The non-transitory computer readable storage medium of claim 19 wherein the computer executable instructions thereon, when executed by a computer processor, further cause the following to be performed:
    determining a mode of image processing to use based on and in response to a value of the agreement value; and
    using the determined mode of image processing to execute the image segmentation.

* * * * *